United States Patent
Fischer

(10) Patent No.: US 11,368,738 B2
(45) Date of Patent: Jun. 21, 2022

(54) METHOD, RECEIVER, MOBILE DISPLAY DEVICE AND SYSTEM FOR ACCESSING MEDIA CONTENT

(71) Applicant: NAGRAVISION S.A., Cheseaux-sur-Lausanne (CH)

(72) Inventor: Jean-Bernard Fischer, Rochejean (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 16/334,949

(22) PCT Filed: Nov. 3, 2017

(86) PCT No.: PCT/EP2017/078114
§ 371 (c)(1),
(2) Date: Mar. 20, 2019

(87) PCT Pub. No.: WO2018/083206
PCT Pub. Date: May 11, 2018

(65) Prior Publication Data
US 2019/0268663 A1 Aug. 29, 2019

(30) Foreign Application Priority Data

Nov. 3, 2016 (EP) ..................................... 16197045

(51) Int. Cl.
*H04N 21/41* (2011.01)
*H04N 21/262* (2011.01)
(Continued)

(52) U.S. Cl.
CPC ..... *H04N 21/4126* (2013.01); *H04L 65/4084* (2013.01); *H04N 21/26291* (2013.01);
(Continued)

(58) Field of Classification Search
CPC ....... H04N 21/47202; H04N 21/26291; H04N 21/4126; H04N 21/4332; H04N 21/43615; H04N 21/437; H04L 65/4084
See application file for complete search history.

(56) References Cited

U.S. PATENT DOCUMENTS 9,037,683 B1 * 5/2015 Yoden ..................... H04L 65/60
709/219
9,749,380 B1 8/2017 Yoden
(Continued)

OTHER PUBLICATIONS

International Search Report dated Jan. 11, 2018, in PCT/EP2017/078114 filed on Nov. 3, 2017.

*Primary Examiner* — Sumaiya A Chowdhury
(74) *Attorney, Agent, or Firm* — Oblon, McClelland, Maier & Neustadt, L.L.P.

(57) ABSTRACT

The disclosure generally relates to a method for accessing media content, said method being used in a receiver (10). The method comprises a preparation phase and a use phase. The preparation phase comprises the steps of obtaining, by said receiver (10), a catalog of media content items, each media content item corresponding to a media content and comprising at least an item description and an item identification data and storing said catalog of media content items in a local database in a memory (13) of the receiver (10). The use phase comprises the steps of accessing, by a mobile display device (11), said catalog of media content items through a local communication channel (16); displaying at least a part of the catalog of media content items on the mobile display device (11); selecting, by said mobile display device (11), at least one media content item displayed on the mobile display device; transmitting, by said mobile display device (11), a request to a content provider (12), the request comprising the item identification data corresponding to said selected media content item and additional data allowing for (Continued)

the receiver (10) to be identified, said transmission using a first remote communication channel (17) distinct from said local communication channel (16); and obtaining by the receiver (10), the media content corresponding to the media content item identified by the identification data contained in said request. The disclosure further relates to a receiver (10) and a mobile display device (11) for implementing the above described method and a system comprising at least said receiver and said mobile display device.

17 Claims, 2 Drawing Sheets

(51) Int. Cl.
| | | |
|---|---|---|
| H04N 21/433 | (2011.01) | |
| H04N 21/437 | (2011.01) | |
| H04N 21/462 | (2011.01) | |
| H04N 21/472 | (2011.01) | |
| H04N 21/482 | (2011.01) | |
| H04L 65/612 | (2022.01) | |
| H04N 21/436 | (2011.01) | |

(52) U.S. Cl.
CPC ....... *H04N 21/437* (2013.01); *H04N 21/4332* (2013.01); *H04N 21/43615* (2013.01); *H04N 21/462* (2013.01); *H04N 21/4622* (2013.01); *H04N 21/472* (2013.01); *H04N 21/47202* (2013.01); *H04N 21/47211* (2013.01); *H04N 21/4821* (2013.01)

(56) References Cited

U.S. PATENT DOCUMENTS

| | | | |
|---|---|---|---|
| 2006/0141988 A1* | 6/2006 | Wendling | H04N 21/41407 455/412.1 |
| 2008/0256580 A1 | 10/2008 | Yang et al. | |
| 2012/0233651 A1* | 9/2012 | Lee | H04N 21/4122 725/110 |
| 2013/0014137 A1* | 1/2013 | Bhatia | G06Q 30/0201 725/9 |
| 2013/0086614 A1* | 4/2013 | Mountain | H04N 5/44582 725/53 |
| 2013/0133017 A1 | 5/2013 | Yang et al. | |
| 2014/0282744 A1* | 9/2014 | Hardy | H04N 21/482 725/61 |
| 2017/0310727 A1 | 10/2017 | Yoden | |
| 2017/0310728 A1 | 10/2017 | Yoden | |

\* cited by examiner

METHOD, RECEIVER, MOBILE DISPLAY DEVICE AND SYSTEM FOR ACCESSING MEDIA CONTENT

TECHNICAL FIELD

The present disclosure generally relates to a method for accessing media content, the method being used in a receiver. The disclosure further concerns a receiver and a system for accessing such media content as well as a mobile receiver used in the method described in this disclosure.

The apparatus and method described in the disclosure can be used for example in the context of broadcast transmission, of video on demand (VOD), near video on demand (NVOD) or streaming. The disclosure further relates to a method and a system allowing for a user to chose one or more specific items of media content among a catalog of available contents, indicating to content provider, which item of media content was chosen and ordering access data to gain access to said item of content, while minimizing the communication costs.

BACKGROUND ART

In the context of Pay TV or more generally when conditional access content and related rights can be acquired by users, a receiver such as for example a set top box, a TV set, a computer, a tablet or any suitable rendering device receives data through a broadcast channel. Usually, content broadcast by a broadcast channel is received at the same time by all receivers, which is an economical way of delivering huge amounts of data to a large number of users. A conditional access system is provided for managing the rights and access conditions allowing for a user to gain access to a broadcast content.

In conventional systems, when a user intends to acquire content, he/she has to contact a call center associated with the content provider and to request rights related to said content through the call center. This is not very user-friendly and can prevent users from consuming content. This way of ordering content is used because in existing systems it may be difficult to provide a direct link between the content provider and a user device, as it is quite common for a user device not to be connected to the content provider through a data return path such as Internet.

According to existing solutions, content and/or rights can be ordered through a mobile display device such as a smart phone, a tablet or the like. From a practical point of view, this is interesting as most of the users possess such a mobile display device and these devices are used to browse content. Moreover, relevant data can be displayed on a mobile device in a way that is very convenient to the user. Specific applications for such mobile display devices can be developed to facilitate the search by a user and the display of relevant data to the user.

Another important point is that these kinds of mobile display devices usually have a data return path which can be used to order content and/or rights from a content provider.

The drawback of this solution is that browsing and/or downloading data is not always possible for free. In some cases, browsing or downloading data can even be quite expensive if using for example a payable 3G network or similar kinds of mobile communication networks such as GSM networks.

When cheap wired IP connectivity is not available and data connection over a 3G/4G network is expensive, offering a rich user experience is a challenge. Often, what is proposed is an enriched program guide on the receiver that allows the user to have pictures and text displayed on the TV. However, this is far from being satisfying from the user point of view because the TV is an awkward means to browse a catalog of content. It is much more practical to use a mobile device and connect to the web site of the operator and browse the catalog, then enjoy the content on the big screen, which is the subject of the referenced patents. But without cheap data connection, this is not possible.

DISCLOSURE

Methods and systems described in the present disclosure may be used to overcome the drawbacks of the prior art. These methods and systems are very convenient to the users though being inexpensive for what concerns communication costs.

An object of the present disclosure concerns a method for accessing media content, the method being used in a receiver. Said method comprises a preparation phase and a use phase, the preparation phase comprising the following steps:
obtaining, by said receiver, a catalog of media content items, each item corresponding to a media content and comprising at least an item description and an item identification data;
storing said catalog of media content items in a local database in a memory of the receiver;
the use phase comprising the following steps:
accessing, by a mobile display device, said catalog of media content items through a local communication channel;
displaying at least a part of the catalog of media content items on the mobile display device;
selecting, by said mobile display device, at least one media content item displayed on the mobile display device;
transmitting, by said mobile display device, a request to a content provider, the request comprising the item identification data corresponding to said selected media content item and additional data allowing for the receiver to be identified, said transmission using a first remote communication channel distinct from said local communication channel,
obtaining by the receiver, the media content corresponding to the media content item identified by the identification data contained in said request.

An object of the disclosure is achieved by a receiver such as defined in the preamble and characterized in that said receiver comprises a memory for storing at least a local database, said local database comprising a catalog of media content items, and in that said receiver further comprises a local communication channel intended to allow communication between said receiver and at least a mobile display device.

A further object of the disclosure concerns a mobile display device characterized in that said mobile display device comprises a local communication channel intended for locally connecting a local database of a receiver, said local database comprising a catalog of media content items, and for selecting at least one media content item from said catalog of media content items, said mobile display device further comprising a first remote communication channel for communicating with a content provider.

Still a further object is achieved by a system for accessing to media content, the system comprising a receiver and at least one mobile display device, characterized in that said system further comprises a local communication channel for enabling communication between the receiver and the mobile display device, a first remote communication channel for enabling communication between the mobile display device and a content provider and a second remote communication channel for enabling communication from the content provider to the receiver.

As will be readily recognized, mobile display devices such as smart phones and tablets, are very intuitive mediums to browse a catalog of movies, media content, or a TV guide. Browsing can be done via the mobile display device, by using, for example, an application developed to offer the user a great user experience. Such an application can display information in a way that is convenient to the user, such as on a web site of the content provider. This enables choosing different kind of displayed elements; it can also enable sorting or selecting different contents. It can also be used to select a content, to display a trailer for the content, to display information about the content such as a summary, the name of the main actors, a cost for acquiring the right to access the content, . . . .

This browsing can however be done for free because the receiver is acting as the web site of the operator over the local link instead of the actual website of the operator on the Internet. The user may only have to pay for sending a request for a specific media content or event once the specific content has been chosen by the user by browsing the catalog of movies or media content items. However, the transmission of such a request implies only a very short communication and the transmission of a small amount of data. Therefore, the cost incurred by the request can be maintained at a very low level corresponding typically to the cost for a single SMS message or IP packet. Thus, the facts that browsing is user friendly and that the mobile display devices have a data return path are used herein. The expensive exchange of a great amount of data can be avoided.

The user can have access to a great amount of diverse data such as data forming an EPG, trailers, pictures, prices, . . . without using the expensive conventional data path. As mentioned above, the method described herein can be used when media content is broadcast. It can however also be used when media content can be received in streaming mode and viewed on a rendering device.

To allow the end user to have an experience similar to a connection to the operator web service, the present disclosure proposes advantageously to build locally in the receiver a duplicate of the operator web site; wherein the mobile device connects to the local web site instead of the real operator site and can enjoy the same user experience that he would have with a data connection without incurring the costs. The user uses cheap over-the-air broadcast bandwidth to feed the local web service. This is done at once on all the receivers, so it is extremely cost effective, as opposed to the point-to-point connection over IP.

BRIEF DESCRIPTION OF DRAWINGS

The present disclosure and its advantages will be better understood with reference to the enclosed drawings and to the description of a detailed embodiment, in which.

MODES FOR CARRYING OUT THE OBJECT OF THE DISCLOSURE

Figure 1:
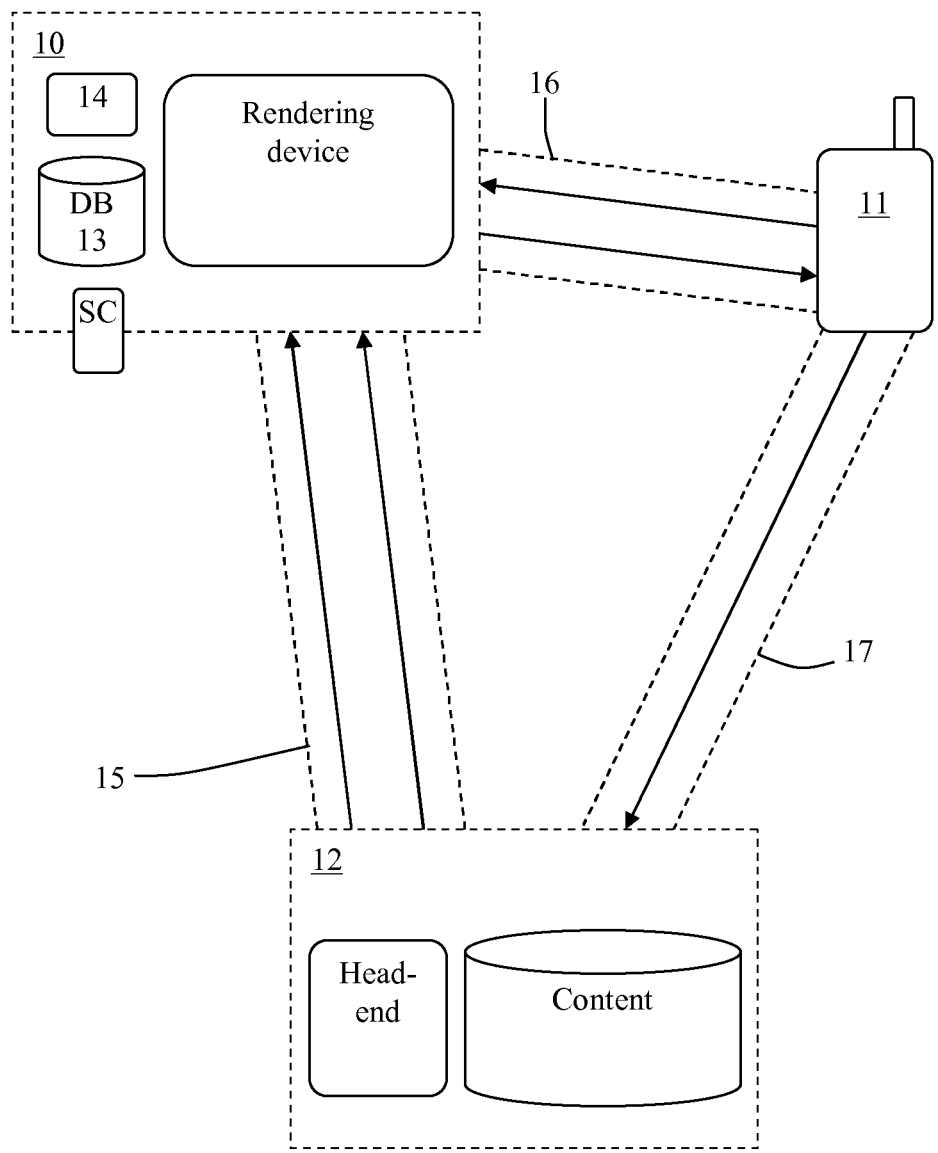
FIG. 1 discloses the elements of the system of the object of the disclosure.
Figure 2:
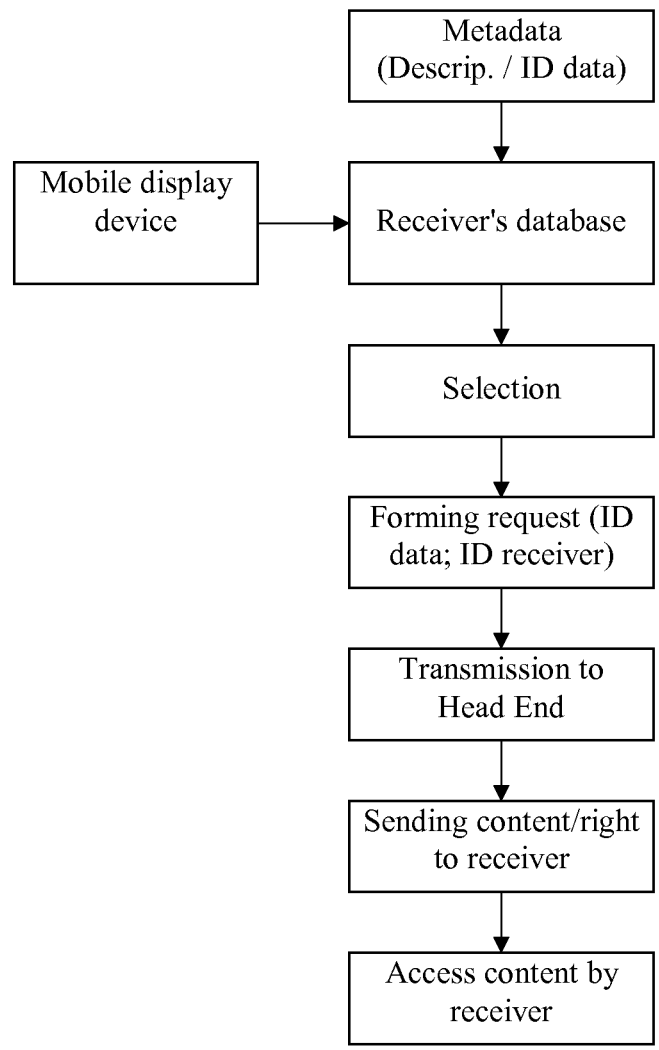
FIG. 2 is a block diagram illustrating the method described in this disclosure.

Referring to FIG. 1, a system comprising a receiver 10 and at least a mobile display device 11 is presented. The system cooperates with a content provider 12 in charge of providing conditional access content to the receiver.

The receiver 10 can be for example a TV set, a Set Top Box or more generally any suitable receiver/rendering device combination. This receiver comprises a memory 13 in charge of hosting a local database. The local database comprises a catalog of media content items, each item comprising at least an item description and item identification data. Each item also corresponds to a media content. The receiver may further comprise a memory 14 for storing structuring data that is used to display metadata in a structured form, as it will be explained in greater detail below.

The receiver further comprises a remote communication channel 15, referred to herein as second remote communication channel, intended to allow said receiver to receive data from the content provider 12.

The mobile display device 11 can be a smart phone, a tablet, a personal digital assistant or the like. This mobile display device 11 comprises a local communication channel 16 allowing for a bidirectional communication with the receiver 10 to be established.

The mobile display device 11 further comprises a first remote communication channel 17 that enables at least a unidirectional communication from the mobile display device 11 to the content provider 12. According to a variant, the first remote communication channel 17 can be bidirectional, which means that the mobile device can also receive data from the content provider 12 through the first remote communication channel 17.

The mobile display device 11 contains software or an application that is able to interpret data received from the receiver 10 and to display, in a structured form, at least one at a time of the items stored in the local database of the receiver.

The content provider 12 comprises a database or other means for storing media content that can be sent, broadcast or otherwise transmitted to receivers. The content provider 12 can play the role of a management center or can cooperate with a management center to manage access rights to contents.

Depending on the implementation, content can be broadcast or can be sent through other communication channels to the respective receivers. The transmission of content to a receiver is made through the second remote communication channel 15. This second remote communication channel is generally unidirectional.

In the case that content is broadcast, said content is usually encrypted by control words that are sent to the respective receivers in Entitlement Control Messages (ECM). These control words are accessible by a receiver only if this receiver has corresponding access rights. These access rights can be sent to the receivers in a conventional Entitlement Management Message (EMM). The entitlement messages can be sent by the management center or by the content provider playing the role of a management center. Checking the access rights and decrypting the entitlement messages to access the control words can be done in a security module SC.

In the case that content is sent to specific users, for example by unicast or multicast, the content may be sent in clear. When the content provider 12 receives a request for a specific item of media content for a specific receiver, the content provider sends this specific item in order to enable the rendering device to display the item in streaming mode.

The content can also be encrypted. The encryption can use a fixed key pertaining to the receiver or to the content. A conventional encryption scheme with control words, entitlement control messages and entitlement management messages can also be used.

The method described in the present disclosure comprises at least two phases, namely a preparation phase and a use phase. In the first phase, or preparation phase, the local database 13 of the receiver 10 is populated or updated via the second remote communication channel 15. According to a preferred embodiment, this second remote communication channel 15 is a broadcast channel or broadcast data path, which makes the transmission of the local data base content very economical. In this preparation phase, a catalog of media content items is sent from the content provider 12 to the receiver 10. Each media content item comprises at least an item description and item identification data. Each media content item corresponds to a media content. In a concrete example, a media content can be a pay TV event such as a movie or a sports game. The item description contains relevant information concerning the item or event, such as a title, a short summary, duration, a trailer, pictures, the cost for acquiring the access rights or the content, the name of the main actors, . . . . If the item is a sports game, relevant information can be the name of the teams, the cost for acquiring the rights to access the content, statistical data, . . . .

Item identification data is a unique value that can be used to uniquely identify the item. Item descriptions can be a part or all pieces of information that is usually used to build an Electronic program guide EPG, as well as other data, as mentioned above and more generally any kind of relevant information.

According to a variant, the database of different receivers contains the same catalog of media content items, provided the databases are updated. According to another variant, the items forming the catalog of media content items can be different in different receivers. The differences could be based on a geographic location of the receiver, on parameters set by the user such as a language, a field of interest, the age, . . . or on a profile. The profile could be created automatically by surveying the type of content consumed by the user, or with the cooperation of the user.

The profile could be established by the content provider or by the receiver. If established by the receiver, the profile can be transferred to the mobile display device by the local communication channel 16 and from the mobile display device 11 to the content provider 12 through the first remote communication channel 17 for statistical reasons for example.

The preparation phase can be carried out at regular intervals or upon a "decision" of the content provider. According to the preferred embodiment, the content provider updates the database regularly over the air.

This update should be carried out sufficiently often to avoid having an out of date database. The frequency of the update can depend on the size of the receiver's memory, the amount of data associated with each event, the media content item corresponding to a given number of days stored in the memory, etc. Some parameters, such as the amount of data for each event, could be set by the user. Data could also be deleted from the memory by the user, to free space. For example, some trailers could be removed from the memory if they concern events the user is not interested in. Data can also be deleted automatically by the receiver when memory space is needed.

The preparation phase may be preceded by an initialization phase in which structuring data is sent to the receiver 10 and stored in this receiver. This structuring data is typically data used to display the content of the local receiver's data base in a structured form. This structuring data can enable displaying the content of the local database as it would be displayed on a web site.

The transmission of structuring data from the content provider 12 to the receiver 10 can be made once, at regular intervals, each time the structuring data in the content provider is changed, each time the local database is updated or at different moments. Thus, the initialization phase can be part of the preparation phase or can precede the preparation phase. The structuring data can depend on the type of receiver. It can also depend on the type of mobile display device that is used to display the content of the local database. The receiver can store several versions of structuring data and use one of these versions depending on the mobile display device used.

The structuring data can be stored in the mobile display 11 device and can be used to display "raw" data received from the receiver. A combination of both embodiments can also be used. This means that both the receiver 10 and the mobile display device 11 may comprise structuring data, which can be identical or different, or partially identical and partially different.

The second phase of the method is the use phase. When the user intends to access media content or to browse a catalog or a list of media content items, for example to view trailers, to check the cost for acquiring a content or a subscription or to check what content is available, he/she uses the mobile display device 11 to access the receiver's database.

More specifically, the mobile display device 11 uses the local communication channel 16 to send a query to the receiver 10 in order to obtain displayable data. The query can contain a mobile display device identifier enabling the receiver to determine the origin of the query. In some implementations, the origin of the query can be determined automatically by the receiver 10, without using the mobile display device identifier. This can be done by determining which local communication channel 16 was used for transmitting the query.

The query can also comprise an indication concerning the type of mobile display device that is used. This indication can be used to select the corresponding structuring data that has to be used to display data on the mobile display device 11 in a structured way.

The indication of the type of mobile display device can also be stored in the receiver 10. By determining which mobile display device 11 sent a query, the receiver 10 can thus determine what structuring data shall be used.

The receiver 10 uses the content of the local database stored in the first memory 13 and the structuring data stored in the second memory 14. These elements are used to prepare a response to the query that is sent to the mobile display device 11. This response can be a file in a known language or format, the content of this file being interpreted by the mobile display device 11 to display the content of the response in a structured form, as on a web site for example.

In a typical example, structuring data can use css (cascading style sheet) files and php (Hypertext Preprocessor) language. The response can be, for example, an html file.

The communication between the receiver 10 and the mobile display device 11 is made through the local communication channel 16. The communication can use a protocol such as Bluetooth, Wi-Fi, Infrared, . . . . As the exchange of data between the mobile display device 11 and the receiver 10 uses local communication channels, browsing can be performed for free. This browsing is done within the receiver's database that was populated during the preparation phase. The formatting of data is done by using the structuring data contained in the receiver 10 and/or in the mobile display device 11.

The mobile display device 11 can host an application allowing for comfortable browsing by the user. This application allows for the response sent from the receiver 10 to the mobile display device 11 in response to the query from the mobile display device to be interpreted. This application could be parameterized to adapt the user's preferences.

According to an embodiment, the user can browse a catalog of media content items or a copy or an "extract" of the web site of the content provider, using only the local communication channel 16.

If the user finds a media content item, he/she intends to acquire, he/she gives a notice to the mobile device. This is done, for example, by selecting a "Purchase" button in the dedicated application on the mobile device 11. This has the effect of preparing a request for the attention of the content provider 12. This request can be prepared in the mobile display device 11 or in the receiver 10. In the case it is prepared in the receiver 10, an instruction is first transmitted from the mobile display device 11 to the receiver 10 through the local communication channel 16, this instruction comprising at least an item identification data of the requested media content. The request is then prepared in the receiver 10 and is then transmitted to the mobile display device 11 through the local communication channel 16.

Once the mobile display device 11 has the request, it can be transmitted to the content provider 12.

The request contains at least a content identification data of the requested media content item and additional data allowing identifying the receiver 10 requesting the media content item. According to a preferred embodiment, said additional data is a unique identifier of the respective receiver.

This can be interesting when a same mobile display device 11 can be used with several different receivers 10. This can also be interesting for verification purposes. The identification value of the receiver can be determined automatically, or can be introduced by the user on the mobile display device. The mobile display device could also display a list of possible choices.

The item identification data is a unique identifier associated with the item description chosen by the user. As already mentioned, one unique item identification data is usually associated with one media content and with an item description containing several pieces of information.

According to another embodiment, the request is sent, without further processing, to the content provider through the first remote communication channel 17. In this embodiment, the content provider 12 can determine automatically which mobile display device 11 sent the request. This is possible because a message sent by conventional mobile display device such as a mobile phone contains an identification number or a phone number. In this embodiment also, the content provider or the associated management center, stores a list of mobile display devices and associated receivers. This means that when the content provider receives a request and is able to determine from which mobile display device the request originates, the content provider can identify the receiver 10 associated with this mobile display device 11. The receiver's identifiers and the corresponding mobile display devices can be registered in the content provider while contracting a subscription.

According to a third embodiment, the request is processed prior to being sent to the content provider 12, in such a way as to insert an identification number of the mobile display device 11. The request is then sent to the content provider 12 and processed as in the first embodiment.

The request is sent by the mobile display device 11 to the content provider 12 though the first remote communication channel 17. This request can be sent by using a mobile communication network and a GSM, 3G or 4G communication protocol, which is usually not free. However, as the request is a very short message and as the amount of data is very small, the cost of the communication is usually low.

When the content provider 12 receives the request, it processes the request to extract the content identification data. The request is also processed to identify the receiver to which access data should be sent. This processing depends on the content of the request and of the implementation of the method. If the request contains the identifier of the receiver, the identifier is extracted from the request. If the request contains the phone number of the mobile display device, this phone number can be used by the content provider or management center to determine the receiver's identifier associated with the mobile display device.

Once the item identification data and the receiver's identifier have been determined, access data to media content can be prepared and sent.

In an embodiment where content is broadcast, rights corresponding to the requested item of media content are prepared for the corresponding receiver. This preparation can comprise preparing a conventional Entitlement Management message EMM for the specific media content and the specific receiver. The right can be sent by broadcast, unicast or by a point to point transmission.

According to a well known scheme, the content is encrypted by control words CW. The control words are embedded in entitlement control messages ECM, these ECM being encrypted by a transmission key. The transmission key is sent to the receiver in an entitlement management message EMM, encrypted by a key known to the receiver. The receiver can gain access to the content by decrypting the entitlement messages. In a first variant, the entitlement management messages and the entitlement control messages are transmitted to the receiver via the second remote communication channel 15. In another variant, one of the entitlement control messages and entitlement management messages is sent to the receiver via the second remote communication channel 15 and the other one of the ECM and EMM is sent to the receiver via the first remote communication channel 17 and the local communication channel 16. In still another variant, the entitlement control messages and the entitlement management messages are sent to the receiver via the first remote communication channel 17 and the local communication channel 16. It is also possible to send some ECM and/or EMM directly to the receiver via the second remote communication channel 15 and some ECM and/or EMM via the first remote communication channel 17 and the local communication channel 16. This embodiment is used for example when content is broadcast or for push Video On Demand (Push VOD).

According to another embodiment, when a request is sent from the mobile display device to the content provider, the management center or the content display device determines the item identification data and the receiver's identifier. The access rights for the specific item of media content and for the specific receiver are also checked. If the corresponding rights are present or can be acquired, the media content is sent to the receiver, in request to allow for this receiver to use the media content. The acquisition of the rights can be linked to a debit of an amount on a user's account. The rights can be present for example further to a subscription. Both embodiments described above can also be combined Once the control words are received and decrypted by the receiver, the content can be decrypted and viewed in a conventional and well-known way.

If the first remote communication channel 17 is bidirectional, an acknowledgement message can be sent from the content provider to the mobile display device via the first remote communication channel. The present disclosure enables an easy and user friendly browsing among a database, without using expensive communications means. It also enables obtaining a requested content while using non expensive communication means.

The invention claimed is:

1. A method for accessing media content, the method for use in a receiver, said method comprising a preparation phase and a use phase,
the preparation phase comprising:
obtaining, by said receiver, a catalog of media content items to be reproduced in the receiver;
the use phase comprising:
receiving, in a mobile display device, said catalog of media content items to be reproduced in the receiver, the mobile display device receiving the catalog of media content items from the receiver through a local communication channel;
selecting, by said mobile display device, at least one media content item from among the media content items in the received catalog;
transmitting, by said mobile display device, a request to a content provider, the request indicating said selected at least one media content item and including additional data allowing for the receiver to be identified, said transmission using a first remote communication channel distinct from said local communication channel over which the catalog of media content items was received from the receiver by the mobile display device;
obtaining by the receiver, the selected at least one media content item indicated in said request; and
obtaining, by the receiver, decryption information allowing the receiver to decrypt the media content item indicated in the request, wherein at least part of the decryption information is obtained from the mobile display device through the local communication channel.

2. The method according to claim 1, wherein the obtaining the decryption information comprises receiving rights enabling access to said selected at least one media content item.

3. The method according to claim 2, wherein the rights enabling access to said selected at last one media content item are obtained through a second remote communication channel distinct from the first remote communication channel.

4. The method according to claim 3, wherein said catalog of media content items is received by the receiver through said second remote communication channel.

5. The method according to claim 3, wherein said selected at least one media content item is received by the receiver through said second remote communication channel.

6. The method according to claim 3, wherein said second remote communication channel is a broadcast channel.

7. The method according to claim 2, wherein the rights enabling access to said selected at least one media content item are obtained by the mobile display device from the content provider through said first remote communication channel and are transmitted to the receiver through said local communication channel.

8. The method according to claim 1, wherein said catalog of media content items comprises data used to build an electronic program guide.

9. The method according to claim 1, wherein the catalog of media content items is received by the receiver through a broadcast transmission, which is different from the first remote communication channel, and
the selected at least one media content item is obtained by the receiver from the broadcast transmission.

10. A receiver for accessing media content, said receiver comprising:
a memory configured to store at least a local database, said local database comprising a catalog of media content items to be reproduced in the receiver,
a local communication channel interface configured to allow a mobile display device to receive from the receiver the catalog of media content items to be reproduced in the receiver, and
a second remote communication channel interface configured to obtain at least one media content item selected by the mobile display device from the catalog of media content items,
wherein the receiver is configured to obtain decryption information allowing the receiver to decrypt the at least one media content item, wherein at least part of the decryption information is obtained from the mobile display device through the local communication channel interface.

11. The receiver according to claim 10, wherein said memory of the receiver is configured to store structuring data used to display at least a part of said catalog of media content items in a structured form.

12. The receiver according to claim 10, wherein each media content item of said catalog of media content items comprises at least an item description and item identification data.

13. The receiver according to claim 10, wherein the second remote communication channel interface is configured to allow communication from a content provider to said receiver.

14. The receiver according to claim 10, wherein the catalog of media content items is received by the receiver through a broadcast transmission, and
the at least one media content item is obtained by the receiver from the broadcast transmission.

15. A mobile display device comprising:
a local communication channel interface configured to connect through a local network to a receiver, in order to receive from the receiver a catalog of media content items to be reproduced in the receiver,
circuitry configured to receive selection of at least one media content item from said catalog of media content items, and
a first remote communication channel interface configured to send a request for the selected at least one media content item to a content provider, wherein
the first remote communication channel interface is further configured to obtain decryption information allowing the receiver to decrypt the selected at least one media content item, and
the local communication channel interface is further configured to send the obtained decryption information to the receiver through the local network.

16. The mobile display device according to claim 15, wherein said mobile display device comprises memory configured to store structuring data used to display at least one media content item of said catalog of media content items in a structured form.

17. A system for accessing to media content, the system comprising:
   a receiver and at least one mobile display device, wherein
   the at least one mobile display device receives, from the receiver via a local communication channel between the receiver and the at least one mobile display device, a catalog of media content items to be reproduced in the receiver,
   the at least one mobile display device transmits a request for a selected media content item from the catalog of media content items via a first remote communication channel between the at least one mobile display device and a content provider,
   the selected media content item is provided to the receiver via a second remote communication channel from the content provider to the receiver,
   decryption information allowing the receiver to decrypt the selected media content item is provided to the receiver from the content provider, and
   at least part of the decryption information is provided to the receiver from the mobile display device through the local communication channel.

\* \* \* \* \*